United States Patent
Dangler et al.

(10) Patent No.: US 11,100,514 B2
(45) Date of Patent: Aug. 24, 2021

(54) AUTHENTICATION SYSTEM FOR PAYMENT CARDS

(71) Applicant: INTERNATIONAL BUSINESS MACHINES CORPORATION, Armonk, NY (US)

(72) Inventors: John R. Dangler, Rochester, MN (US); Layne Berge, Rochester, MN (US); Jason J. Bjorgaard, Rochester, MN (US); Thomas Liang, Rochester, MN (US); Manuel Orozco, Rochester, MN (US); Matthew Doyle, Chatfield, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 103 days.

(21) Appl. No.: 16/157,367

(22) Filed: Oct. 11, 2018

(65) Prior Publication Data

US 2020/0118129 A1 Apr. 16, 2020

(51) Int. Cl.
*G06Q 40/00* (2012.01)
*G06Q 20/40* (2012.01)
*G06Q 20/34* (2012.01)
*G06K 19/07* (2006.01)
*G06K 7/10* (2006.01)

(52) U.S. Cl.
CPC ....... *G06Q 20/409* (2013.01); *G06K 7/10366* (2013.01); *G06K 19/0723* (2013.01); *G06Q 20/352* (2013.01)

(58) Field of Classification Search
CPC ......... G06Q 40/00; G06Q 40/08; G06Q 20/00
See application file for complete search history.

(56) References Cited

U.S. PATENT DOCUMENTS

| 8,130,078 | B2 | 3/2012 | Tassy et al. |
| 9,024,719 | B1* | 5/2015 | Saunders ............... G06Q 50/22 340/5.61 |
| 9,483,920 | B1* | 11/2016 | Anderson ........ G06K 19/07705 |
| 9,760,871 | B1* | 9/2017 | Pourfallah ............. G06Q 50/22 |
| 9,779,392 | B1* | 10/2017 | Prasad ............... G06Q 20/0425 |
| 2009/0102120 | A1 | 4/2009 | Hou et al. |
| 2011/0139869 | A1* | 6/2011 | Bonalle .................. G06Q 10/02 235/380 |

(Continued)

FOREIGN PATENT DOCUMENTS

WO WO-2011071401 A1 * 6/2011 ............. G07C 13/00

*Primary Examiner* — Bennett M Sigmond
*Assistant Examiner* — Xavier M. Bennett
(74) *Attorney, Agent, or Firm* — Cantor Colburn LLP; Nathan Rau

(57) ABSTRACT

Systems, methods, and cards utilized for an authentication protection layer for payment card transactions are provided. Aspects include receiving, by a transaction processing terminal, the card for the potential transaction. Obtaining card holder information for the card and transmitting a radio frequency (RF) signal and receiving RFID data from an RFID tag associated with the card. Comparing, by a processor, the card holder information to the RFID data to determine whether to authorize the potential card transaction and authorizing the potential card transaction based at least on a determination that the RFID data corresponds to the card holder information.

14 Claims, 6 Drawing Sheets

(56) References Cited

U.S. PATENT DOCUMENTS

| | | | |
|---|---|---|---|
| 2012/0253852 A1* | 10/2012 | Pourfallah | G06Q 20/3276 |
| | | | 705/4 |
| 2013/0140358 A1* | 6/2013 | Graef | G06Q 40/02 |
| | | | 235/379 |
| 2013/0166332 A1* | 6/2013 | Hammad | G06Q 40/10 |
| | | | 705/5 |
| 2013/0218657 A1* | 8/2013 | Salmon | G06Q 10/00 |
| | | | 705/14.29 |
| 2015/0379390 A1* | 12/2015 | Morris | B01L 3/5453 |
| | | | 235/492 |
| 2016/0162676 A1 | 6/2016 | Myers et al. | |
| 2017/0178245 A1* | 6/2017 | Rodkey | G06F 16/00 |

* cited by examiner

AUTHENTICATION SYSTEM FOR PAYMENT CARDS

BACKGROUND

The present invention generally relates to security authentication, and more specifically, to an authentication system for payment cards.

Payment transactions utilizing physical payment cards such as credit cards, debit cards, bank cards, and the like typically require the holder of the card to be present at a transaction processing station to enact payment for goods and services. However, due to the nature of these payment cards being valuable, theft of these cards is a common problem. Various security measures associated with payment cards include, for example, a personal identification numbers (PIN) or the collection of identifying information from the user prior to completing a transaction. However, some payment cards do not require PINs, such as credit cards, and the collection of identifying information sometimes is not performed by employees utilizing a transaction processing station.

SUMMARY

Embodiments of the present invention are directed to a computer-implemented method for authentication of a card for a potential transaction. A non-limiting example of the computer-implemented method includes receiving, by a transaction processing terminal, the card for the potential transaction. Obtaining card holder information for the card and transmitting a radio frequency (RF) signal and receiving RFID data from an RFID tag associated with the card. Comparing, by a processor, the card holder information to the RFID data to determine whether to authorize the potential card transaction and authorizing the potential card transaction based at least on a determination that the RFID data corresponds to the card holder information.

Embodiments of the present invention are directed to a system for authentication of a card for a potential transaction. A non-limiting example of the system includes a transaction processing terminal having a card reader and an RF transceiver that are communicatively coupled to a processor and the memory, wherein the processor is configured to receive, by a transaction processing terminal, the card for the potential transaction, obtain card holder information for the card, transmit a radio frequency (RF) signal and receiving RFID data from an RFID tag associated with the card, compare the card holder information to the RFID data to determine whether to authorize the potential card transaction, and authorize the potential card transaction based at least on a determination that the RFID data corresponds to the card holder information.

Embodiments of the invention are directed to a card, the card including a first region of the card, wherein the first region is a static region, a second region of the card, wherein the second region is a dynamic region configured to be manipulated to adjust an orientation of the second region with respect to the first region, and an RFID tag disposed on the second region.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
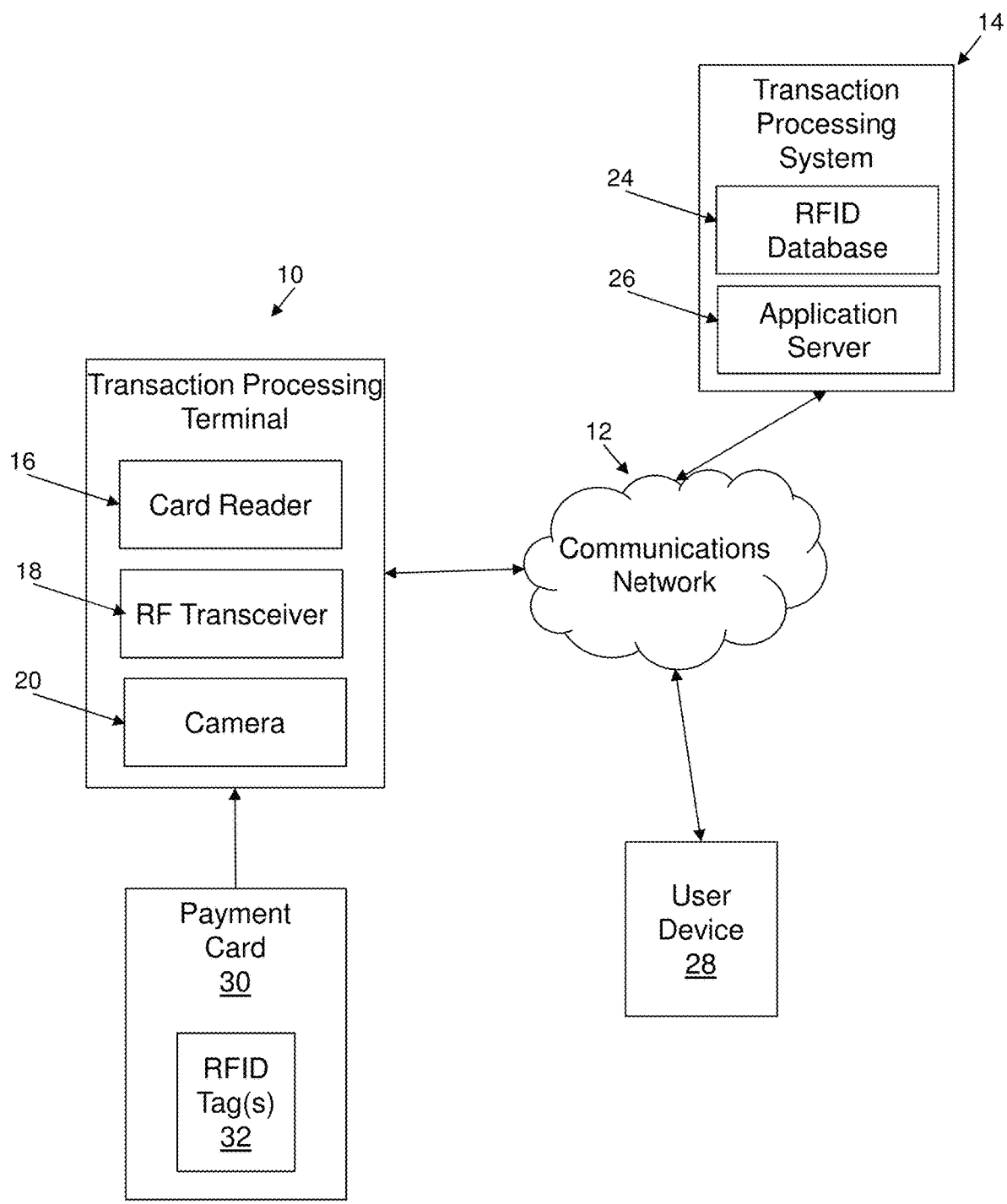
FIG. 1 depicts a block diagram of a system for authentication of a card for a potential transaction in accordance with an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, at some transaction processing stations that are utilized for accepting payment for goods and services using a payment card, the identity of the individual using the payment card is not always verified prior to collecting payment. These payment cards run the risk of being stolen by thieves who later attempt to utilize the payment card and "pretend" to be the card owner at these transaction processing stations. Some example transaction processing stations include credit card readers at a grocery store or a card reader installed at a fuel pump as a fuel station. In some cases, the owners of the transaction processing stations fail to request identification information or, in some cases, there is no individual located at the transaction processing station, such as at the fuel pump. This can cause financial loss to the owner of the card and to business concerns associated with the payment card or transaction as, often times, card owners are not liable for all or a portion of amounts stolen by thieves utilizing the owner's payment card. An additional layer of security is needed to stop thieves that possess a physical payment card from utilizing the card at the above described transaction processing stations to ensure an authorized individual is using the payment card.

Turning now to an overview of the aspects of the invention, one or more embodiments of the invention address the above-described shortcomings of the prior art by providing systems, methods and computer program products for an authentication protection layer for payment card transactions. In one or more embodiments of the invention, a transaction processing terminal (station) includes a radio frequency (RF) scanner that is configured to transmit an RF signal and detect and capture RFID tag information from a payment card being utilized in a transaction. In one or more embodiments of the invention, the payment card includes one or more direction RFID tags that when present near an RF signal, such as the RF signal at the transaction processing terminal, provides RFID tag data for the payment card that can utilized to determine that the payment card is being utilized by an authorized user of the payment card. The RFID tags on the payment card are direction RFID tags that provide the authorized RFID tag data when arranged in a user-defined manner on the payment card. This arrangement of the RFID tags determines if the payment card is used by an authorized user. Other configurations of the RFID tags would cause the payment transaction to be declined. In one or more embodiments of the invention, the RF scanner can be used individually or in combination with other security measures for verifying the validity of a charge on the payment card such as, for example, embedded chips being read on the payment card by the transaction processing terminal.

Referring now to FIG. 1, a block diagram of a system for authenticating payment cards using an RF scanning and detection in accordance with an embodiment of the present invention is shown. As shown, the system includes a transaction processing terminal 10 that is in communication with a transaction processing system 14 via a communications network 12. The transaction processing terminal 10 can be an Automated Teller Machine (ATM), a point of sale (POS) terminal, or the like. The transaction processing terminal 10 includes a card reader 16 that is configured to read the magnetic strip of the payment card or the chip of the payment card to retrieve account information. The transaction processing terminal 10 includes an RF transceiver 18 that is configured to transmit an RF signal and receive data from RFID tags that are proximate to the transaction processing terminal 10. In exemplary embodiments, the transaction processing terminal 10 also includes a camera 20 that can be used to capture an image of the user of a payment card 30.

In embodiments of the invention, the transaction processing terminal 10 is configured to accept payment for transactions from a payment card 30 having associated RFID tag(s) 32. As described in further detail below, the RFID tag(s) 32 are physically maneuverable on the payment card 30 and due to the directionality of the RFID tags 32, only certain configurations or arrangements of the RFID tags produce authentication RFID information to an RF scanner (transceiver 18) when being utilized in a payment transaction. The transaction processing terminal 10, when interacting with the payment card 30 collects information about the card holder such as name, account information, and the like. The transaction processing system 14 includes an RFID tag database 24 that is used to store configurations or user-defined arrangements of RFID tags 32 associated with the payment card 30. The transaction processing system 14 also includes an application server 26 that can be accessed by a user device 28 through, for example, the communications network 12. The application server 26 can perform functions for a user device 28 operating an application to interact with a payment card owner to set, adjust, delete, or suspend the RFID tag arrangement on the payment card. For example, an owner of a payment card can adjust the arrangement of RFID tags 32 on the payment card 30 to update security for the payment card 30 when utilized at the transaction processing terminal 10. The arrangement of the RFID tags are described in greater detail below.

In embodiments of the invention, a payment card 30 owner can enact payment for a transaction at a transaction processing terminal 10 by presenting the payment card 30. During the process of reading the payment card 30 by the card reader 16, the card reader 16 collects information about the payment card 30 such as name on the card and other identifying information such as, for example, account numbers, balances, and the like. At or around the same time, the RF transceiver 18 can transmit an RF signal to detect authentication RFID tag data bouncing off the RFID tags 32. The RFID tag data is detected or received by the RF transceiver 18 and along with the card holder information is compared to the RFID database 24 on the transaction processing system 14. When the RFID tags 32 are arranged according to the RFID database 24, the correct authentication RFID tag data is received by the RF transceiver 18 and verified by the transaction processing system 14 allowing for the payment transaction to be completed. The RFID tag 32 orientation and location on the payment card 30 is tied to the owner of the payment card in the RFID database 24 or stored on the transaction processing system 14. In embodiments of the invention, when incorrect RFID tag data for a card holder is compared to the RFID databased 24 due to an improper arrangement of the RFID tags 32 on the payment card, the payment transaction can be declined. In an embodiment of the invention, when a payment transaction is declined, additional security measures can be triggered such as sending a text message to the owner of the payment card 30 or a camera 20 can be triggered based on the improper RFID tag arrangement to capture one or more images of the individual using the payment card 30.

Figure 2:
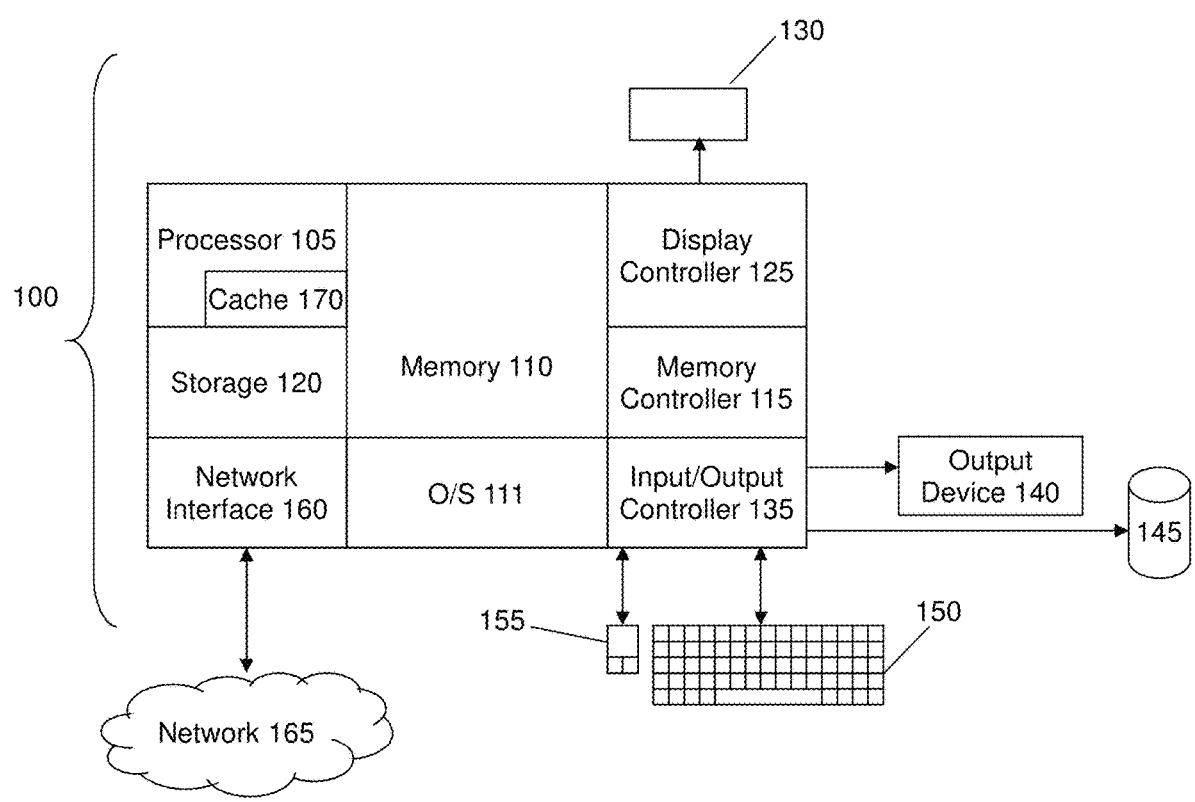
FIG. 2 depicts a block diagram of a processing system in accordance with an embodiment of the present invention.

In exemplary embodiments, the transaction processing system 14 may be embodied in a processing system such as the one shown in FIG. 2. FIG. 2 illustrates a block diagram of a processing system 100 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer, such as a personal computer, workstation, minicomputer, or mainframe computer.

In some embodiments, as shown in FIG. 2, the processing system 100 includes a processor 105, a memory 110 coupled to a memory controller 115, and one or more input devices 145 and/or output devices 140, such as peripheral or control devices that are communicatively coupled via a local I/O controller 135. These devices 140 and 145 may include, for example, battery sensors, position sensors, cameras, microphones and the like. Input devices such as a conventional keyboard 150 and mouse 155 may be coupled to the I/O controller. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor, a semiconductor based microprocessor (in the form of a microchip or chip set), a macroprocessor, or other device for executing instructions. The processor 105 includes a cache 170 that can be organized as a hierarchy of more cache levels (L1, L2, etc.).

The memory 110 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read-only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The processing system 100 may further include a display controller 125 coupled to a user interface or display 130. In some embodiments, the display 130 may be an LCD screen. In some embodiments, the processing system 100 may further include a network interface 160 for coupling to a communications network 165. The network 165 may be an IP-based network for communication between the processing system 100 and an external server, client and the like via a broadband connection. In some embodiments, the network 165 may be a managed IP network administered by a service provider. The communications network 165 may be implemented in a wireless fashion, e.g., using wireless protocols and technologies, such as WiFi, WiMax, satellite, etc. The communications network 165 may also be a packet-switched network such as a local area network, wide area network, metropolitan area network, the Internet, or other similar type of network environment. The communications network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in the processing system 100, such as that illustrated in FIG. 2.

Figure 3A:
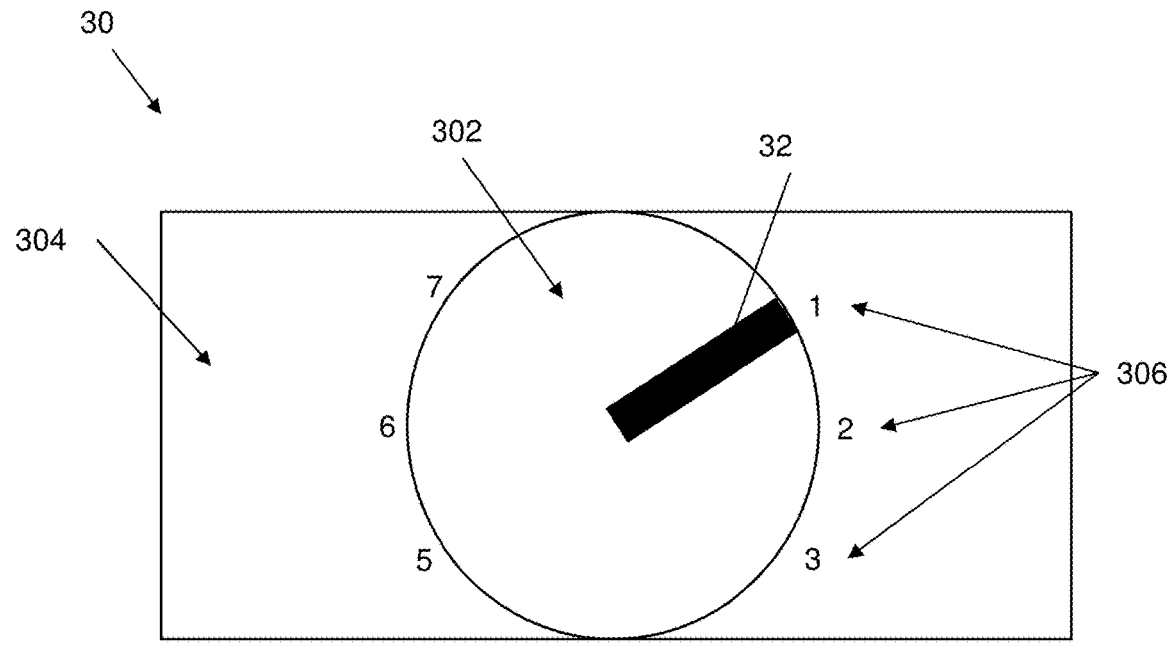
FIG. 3a depicts a block diagram of a payment card with configurable RFID tags in accordance with one or more embodiments of the present invention.

Referring now to FIG. 3a, a block diagram of a payment card 30 with configurable RFID tags 32 is shown in accordance with one or more embodiments of the present invention. The payment card 30 includes a static region 304 with a dynamic region 302 embedded in the static region 304. In embodiments of the invention, a directional RFID tag 32 is disposed on the dynamic region 302. In illustrated example, the dynamic region 302 is in the shape of a circle, however, any shape can be utilized herein. The dynamic region 302 is configured to be adjusted in a 360 degree configuration around the payment card 30. As the dynamic region 302 is adjusted, the RFID tag 32 changes its orientation and location with respect to the static region 304. In embodiments of the invention, alpha-numeric orientation guides 306 can be utilized to assist an owner of the payment card 30 to remember and properly orient the RFID tag 32 on the payment card 30. When utilizing the payment card 30, the owner of the payment card 30 can use his or her fingers to rotate the dynamic region 302 in a 360 degree fashion, in this example, to line up the RFID tag 32 to the appropriate location and thus allow for proper processing of the transaction when utilized with the transaction processing terminal 10 from FIG. 1. In the illustrative example, the correction RFID tag position is shown and corresponds to orientation guide "1." Any other configurations of the RFID tag 32, in this example, could cause the payment card to be declined by the processing terminal 10 from FIG. 1.

Figure 3B:
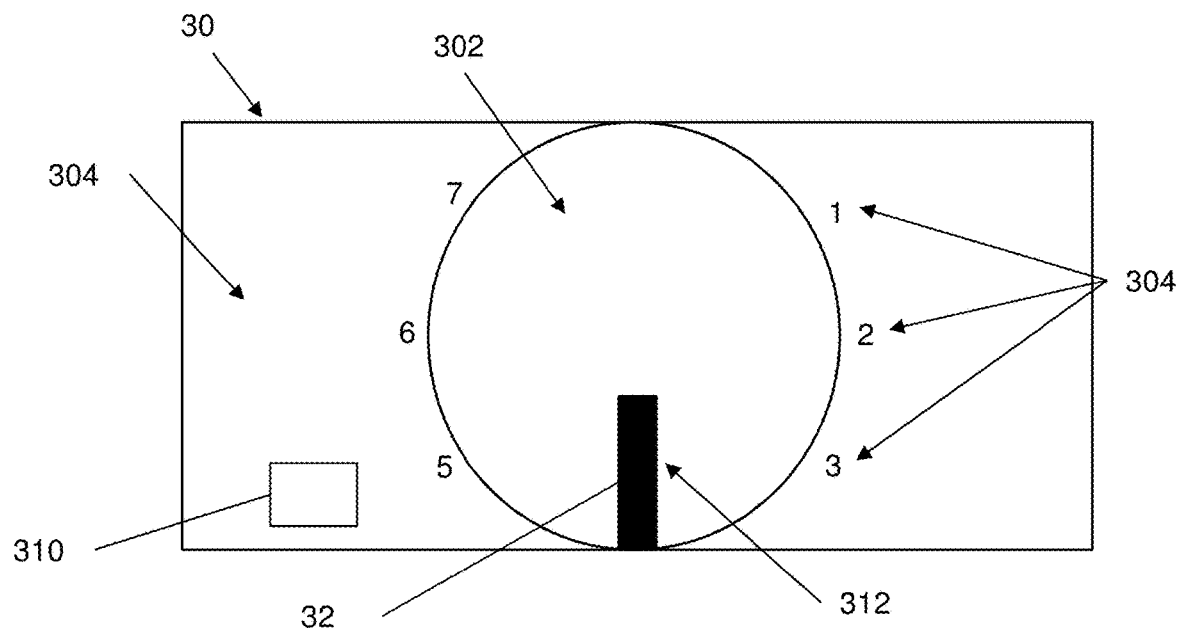
FIG. 3b depicts a block diagram of a payment card with configurable RFID tags in accordance with one or more embodiments of the present invention.

Referring now to FIG. 3b, a block diagram of the payment card 30 with configurable RFID tags 32 is shown in accordance with one or more embodiments of the present invention. The payment card 30 includes a reset button or switch 310 that allows a user of the payment card 30 to reset the location of the RFID tag 32 to a default location 312. In embodiments of the invention, a user of the payment card 30 can adjust the dynamic region on the payment card 30 prior to engaging in a payment transaction. Upon completion of the payment transaction, the user can press or otherwise engage the reset button or switch 310 to cause the RFID tag 32 to return to the default location 312 and thus ensure further security for the payment card. In another embodiments, the dynamic region 302 can automatically reset to the default location 312 using a spring or other mechanism for rotating the dynamic region 302 to the default location 312. This reset to the default location 312 can also, in another embodiment of the invention, be triggered by the completion of a payment transaction where a mechanism on the transaction processing terminal 10 causes another mechanism on the card to reset the RFID tag 32 to the default location.

Figure 4:
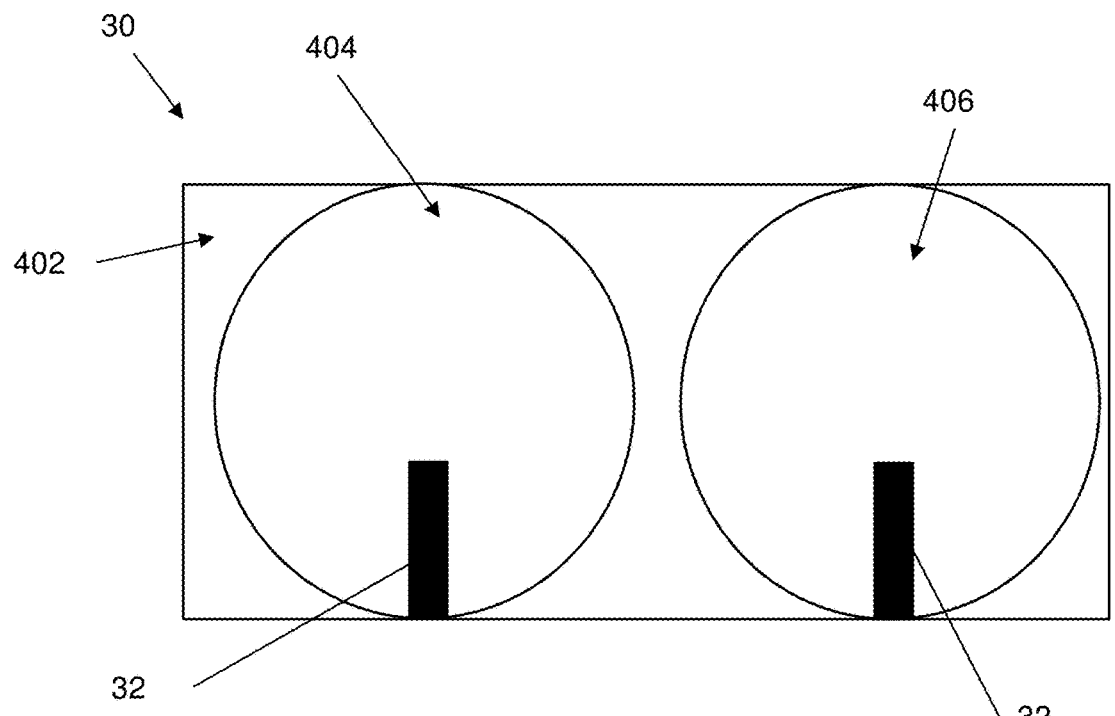
FIG. 4 depicts a block diagram of a payment card with configurable RFID tags in accordance with one or more embodiments of the present invention.

Referring to FIG. 4, a block diagram of the payment card 30 with configurable RFID tags 32 is shown in accordance with one or more embodiments of the present invention. In embodiments of the invention, the payment card 30 includes a static region 402 along with a first dynamic region 404 and a second dynamic region 406 embedded in the static region 402. In embodiments of the invention, a directional RFID tag 32 is disposed on the first dynamic region 404 and the second dynamic region 406. In illustrated example, the first dynamic region 404 and second dynamic region 406 is in the shape of a circle, however, any shape can be utilized herein. Each of the dynamic regions 404, 406 are configured to be adjusted in a 360 degree configuration around the payment card 30. As the dynamic regions 404, 406 are adjusted, the RFID tags 32 each change their orientation and location with respect to the static region 402. The addition of a second dynamic region 406 allows for more combinations for the orientation and location of the RFID tags 32 on the payment card 30. In embodiments of the invention, proper orientation and location of the RFID tags 32 can be required for processing a payment transaction. In embodiments of the invention, a reset button 310 (shown in FIG. 3b) can be included to reset both dynamic regions 404, 406 to default location. Additionally, the default location can vary between the two dynamic regions 404, 406 and/or be user defined for each region 404, 406.

Figure 5:
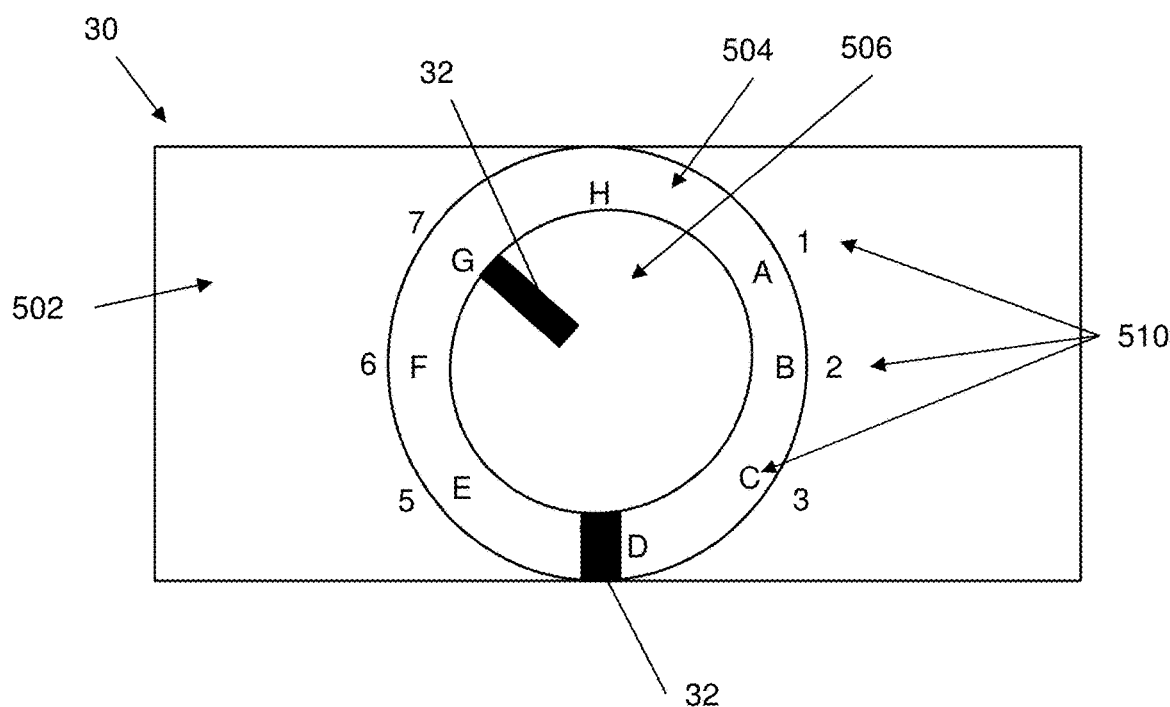
FIG. 5 depicts a block diagram of a payment card with configurable RFID tags in accordance with one or more embodiments of the present invention.

Referring to FIG. 5, a block diagram of the payment card 30 with configurable RFID tags 32 is shown in accordance with one or more embodiments of the present invention. In embodiments of the invention, the payment card 30 includes a static region 502 along with a first dynamic region 504 embedded in the static region 502. A second dynamic region 506 can be embedded within the first dynamic region 504. In embodiments of the invention, the first dynamic region 504 can be configured to rotate 360 degrees around the second dynamic region 506. The second dynamic region is configured to rotated 306 degrees within the first dynamic region 504. An RFID tag 32 is disposed on the first dynamic region 504 and can be rotated around the second dynamic region 506. Another RFID tag 32 is disposed on the second dynamic region 506 and can be rotated to change the orientation and location of the RFID tag 32. In embodiments of the invention, alpha-numeric orientation guides 510 can be utilized to assist an owner of the payment card 30 to remember and properly orient the RFID tags 32 on the payment card 30. In embodiments of the invention, proper orientation and location of the RFID tags 32 can be required for processing a payment transaction.

Figure 6:
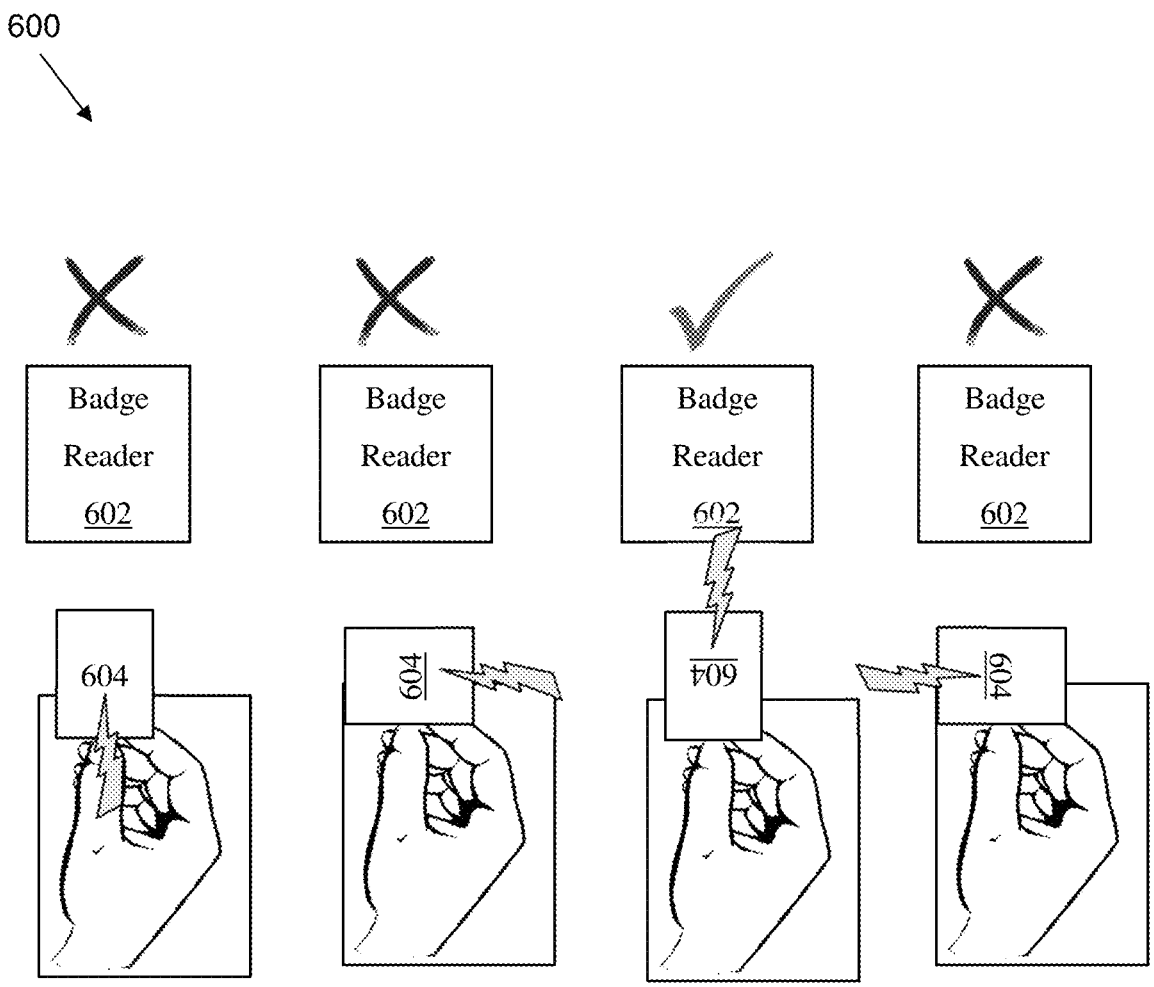
FIG. 6 depicts a block diagram of an identification (ID) badge reading system utilizing RF scanning for authenticating ID badges with directional RFID tags according to alternate embodiments of the present invention.

Referring now to FIG. 6, a block diagram of an identification (ID) badge reading system utilizing RF scanning for authenticating ID badges with directional RFID tags according to one or more embodiments of the present invention. In embodiments of the invention, the badge reader 602 includes an RF scanner that is configured to transmit an RF signal when an individual utilizing an ID badge 604 is in range of the badge reader 602. The ID badge 604 includes direction RFID tags, as described above, which are embedded in the ID badge 604. The RFID tags are only read properly by the RF scanner when the orientation of the ID badge is properly presented to the badge reader 602. As shown in the illustrated example, the first attempt for access by the individual holding the ID badge 604 is unsuccessful due to the improper orientation of the ID badge 604 and thus the RFID tag embedded in the ID badge 604. The system 600 shows four attempts are orienting the ID badge 604 and the corresponding RFID orientation where when the ID badge 604 is presented correctly in the third attempt (upside down), access can be granted by the badge reader 602.

Figure 7:
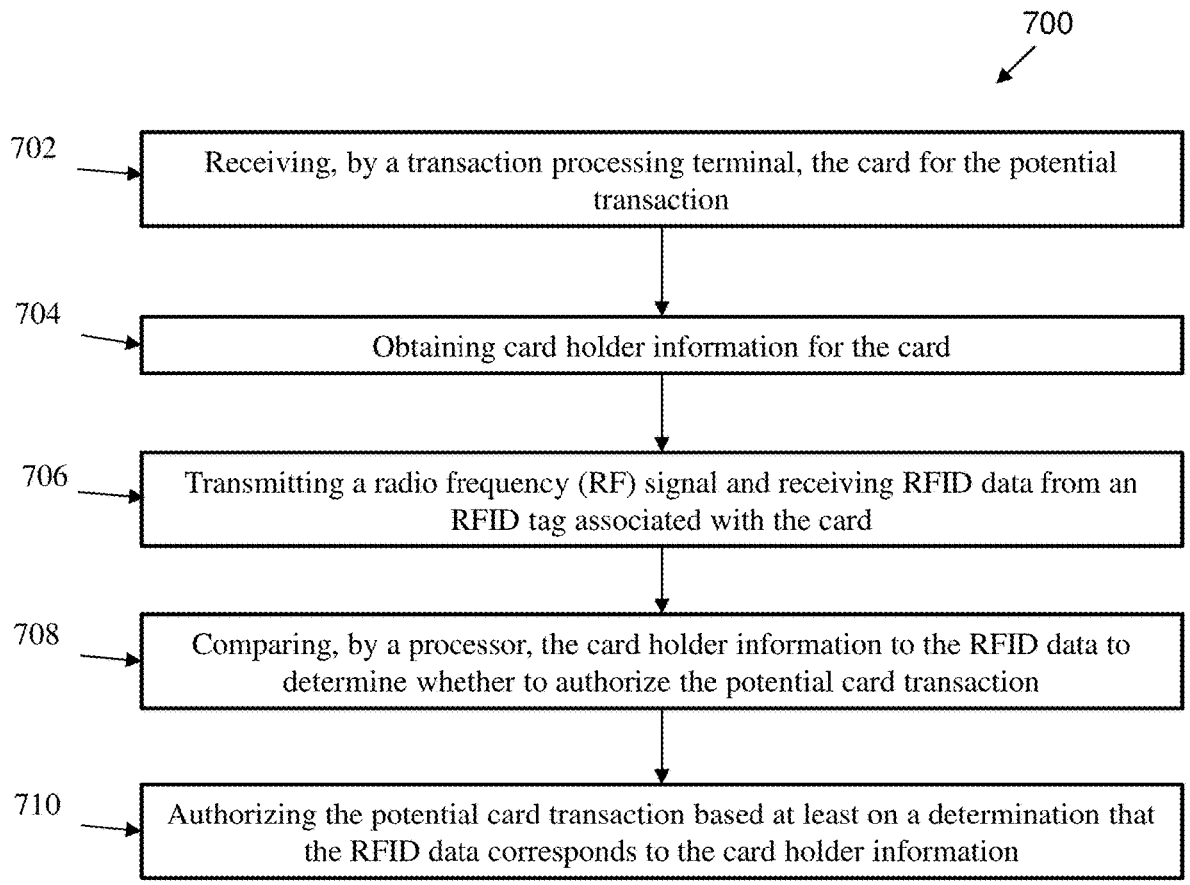
FIG. 7 depicts a flow diagram of a method for authentication of a card for a potential transaction according to one or more embodiments of the invention.

FIG. 7 depicts a flow diagram of a method for authentication of a card for a potential transaction according to one or more embodiments of the invention. The method 700 includes receiving, by a transaction processing terminal, the card for the potential transaction, as shown in block 702. The transaction processing terminal can include a payment or point of sale (POS) system or can be a badge reader that allows access to restricted areas in a building. When a potential transaction occurs, the method 700 includes obtaining card holder information for the card, as shown at block 704. The card can be a credit card, ID badge, and the like. The card holder information can be taken from the card itself or obtained from a server after obtaining account information from the card. For authentication of the card, the method 700 includes transmitting a radio frequency (RF) signal and receiving RFID data from an RFID tag associated with the card, as shown in block 706. The method 700, at block 708, includes comparing, by a processor, the card holder information to the RFID data to determine whether to authorize the potential card transaction. And at block 710, the method 700 includes authorizing the potential card transaction based at least on a determination that the RFID data corresponds to the card holder information.

Additional processes may also be included. It should be understood that the processes depicted in FIG. 7 represent illustrations, and that other processes may be added or existing processes may be removed, modified, or rearranged without departing from the scope and spirit of the present.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for authentication of a card for a potential transaction, the method comprising:
   receiving, by a transaction processing terminal, the card for the potential transaction;
   obtaining card holder information for the card;
   transmitting a radio frequency (RF) signal and receiving radio frequency identification (RFID) data from an RFID tag associated with the card, wherein the card comprises a first region and a second region;
      wherein the second region is a dynamic region configured to be manipulated to adjust an orientation of the second region with respect to the first region;
      wherein the RFID tag is disposed on the second region of the card;
      wherein adjusting the orientation of the second region changes an orientation of the RFID tag;
      wherein the RFID data received by the transaction processing terminal changes based on the orientation of the RFID tag on the second region with respect to the first region;
   comparing, by a processor, the card holder information to the RFID data to determine whether to authorize the potential card transaction; and
   authorizing the potential card transaction based at least on a determination that the RFID data corresponds to the card holder information.

2. The computer-implemented method of claim 1, further comprising:
   declining the potential card transaction based at least on a determination that the RFID data conflicts with the card holder information.

3. The computer-implemented method of claim 2, further comprising:
   responsive declining the potential card transaction, triggering a security measure for the card.

4. The computer-implemented method of claim 1, wherein the RFID data further varies based at least in part on a location of the RFID tag on the card.

5. A system for authentication of a card for a potential transaction, the system comprising:
   a memory;
   a transaction processing terminal having a card reader and an RF transceiver that are communicatively coupled to a processor and the memory, wherein the processor is configured to:
      receive, by a transaction processing terminal, the card for the potential transaction;
      obtain card holder information for the card;
      transmit a radio frequency (RF) signal and receiving radio frequency identification (RFID) data from an RFID tag associated with the card, wherein the card comprises a first region and a second region;
      wherein the second region is a dynamic region configured to be manipulated to adjust an orientation of the second region with respect to the first region;
      wherein the RFID tag is disposed on the second region of the card;
      wherein adjusting the orientation of the second region changes an orientation of the RFID tag;
      wherein the RFID data received by the transaction processing terminal changes based at least in part on the orientation of the RFID tag on the second region with respect to the first region;
      compare the card holder information to the RFID data to determine whether to authorize the potential card transaction; and
      authorize the potential card transaction based at least on a determination that the RFID data corresponds to the card holder information.

6. The system of claim 5, wherein the processor is further configured to:
   decline the potential card transaction based at least on a determination that the RFID data conflicts with the card holder information.

7. The system of claim 6, wherein the processor is further configured to:
   responsive declining the potential card transaction, trigger a security measure for the card.

8. The system of claim 5, wherein the RFID data further varies based at least in part on a location of the RFID tag on the card.

9. A card comprising:
   a first region of the card, wherein the first region is a static region;
   a second region of the card, wherein the second region is a dynamic region configured to be manipulated to adjust an orientation of the second region with respect to the first region; and
   radio frequency identification (RFID) tag disposed on the second region, the RFID tag comprising RFID data, wherein the RFID data received by a transaction processing terminal changes based at least in part on an orientation of the RFID tag on the second region with respect to the first region, and wherein adjusting the orientation of the second region changes an orientation of the RFID tag.

10. The card of claim 9, wherein the RFID tag changes location based on manipulation of the second region of the card.

11. The card of claim 9, wherein the RFID tag changes orientation based on manipulation of the second region of the card.

12. The card of claim 9, wherein the RFID tag is a first RFID tag; and wherein the card further comprises:
   a third region of the card wherein the third region is a dynamic region configured to be manipulated to adjust the orientation of the third region with respect to the first region and the second region;
   a second RFID tag disposed on the third region.

13. The card of claim 12, wherein the second RFID tag changes location based on manipulation of the third region of the card.

14. The card of claim 9, wherein the second RFID tag changes orientation based on manipulation of the third region of the card.

* * * * *